United States Patent [19]

Burrington et al.

[11] Patent Number: 4,560,730

[45] Date of Patent: Dec. 24, 1985

[54] PROCESS FOR MAKING DIMERIZATION CATALYSTS

[75] Inventors: James D. Burrington, Richmond Heights; Robert K. Grasselli, Chagrin Falls; Fred Pesa, Aurora; Elizabeth A. Maher, University Heights, all of Ohio

[73] Assignee: The Standard Oil Company, Cleveland, Ohio

[21] Appl. No.: 673,707

[22] Filed: Nov. 21, 1984

Related U.S. Application Data

[63] Continuation of Ser. No. 591,160, Mar. 19, 1984, abandoned, which is a continuation of Ser. No. 355,805, Mar. 8, 1982, abandoned.

[51] Int. Cl.$^4$ ............................................... C08F 8/40
[52] U.S. Cl. ............................... 525/340; 525/326.6; 525/332.2; 525/341; 525/359.1; 525/359.3; 525/370

[58] Field of Search ............ 525/340, 341, 359.1, 525/359.3, 370

[56] References Cited

U.S. PATENT DOCUMENTS

| | | | |
|---|---|---|---|
| 3,933,770 | 1/1976 | Ikeda et al. | 525/370 |
| 4,098,727 | 6/1978 | Haag et al. | 525/340 |
| 4,111,856 | 9/1978 | Haag et al. | 525/370 |
| 4,276,395 | 6/1981 | Vollhardt et al. | 525/332.3 |

*Primary Examiner*—Joseph L. Schofer
*Assistant Examiner*—Bernard Lipman
*Attorney, Agent, or Firm*—Charles S. Lynch; John E. Miller; Larry W. Evans

[57] ABSTRACT

This application discloses an improvement in the preparation of a ruthenium complex supported on an organic polymer, wherein the complex is added to the support over an extended period of time rather than all at once.

8 Claims, No Drawings

PROCESS FOR MAKING DIMERIZATION CATALYSTS

This is a continuation of Ser. No. 591,160, filed Mar. 19, 1984, now abandoned, which a continuation of application Ser. No. 355,805 filed Mar. 8, 1982, now abandoned.

BACKGROUND OF THE INVENTION

The present invention relates to an improved technique for producing an acrylonitrile dimerization catalyst composed of a ruthenium complex on an organic polymer support.

Commonly assigned U.S. Ser. No. 291,708, now U.S. Pat. No. 4,422,980, the disclosure of which is incorporated herein by reference, discloses certain acrylonitrile dimerization catalysts which comprise a polymeric material having a ruthenium complex bonded thereto. In general, these catalysts are made by mixing the polymer support and an excess of the ruthenium complex together for a suitable period of time. In accordance with the present invention, it has now been discovered that the ability of the catalyst to produce the desired dimerization product is significantly enhanced if the ruthenium complex is added to the polymer support over an extended period of time as opposed to all at once.

Thus, the present invention provides a process for producing catalysts comprising a polymer support having a ruthenium complex bonded thereto, the polymer support comprising an organic polymer backbone having trivalent pendant atoms selected from P, As, Sb, Bi and N covalently bonded thereto and randomly distributed in the polymer, the ruthenium complex capable of catalyzing the dimerization of acrylonitrile to adiponitrile and/or 1,4-dicyanobutenes and comprising Ru and at least two homogeneous ligands having at least four ligating bonds bonding to the Ru, the Ru in each ruthenium complex datively bonding to a pendant atom in the polymer support, the Ru/pendant atom ratio in the catalyst being at least 0.001, the complex having on the average no more than one homogeneous phosphine ligand per atom of ruthenium, the process comprising adding the ruthenium complex to the polymer support over a period of time of at least 3 hours.

DETAILED DESCRIPTIONS

Catalyst

The catalysts to which the inventive process relates are composed of a polymer support having a ruthenium complex bonded thereto via pendant atoms selected from the group consisting P, As, Sb, Bi and N.

The polymer support of these catalysts is composed of an organic polymer backbone carrying the pendant atoms. The nature of the organic polymer backbone is not critical, and any type of polymer can be used. Most conveniently, the polymer backbone is a styrene polymer or copolymer in which the pendant atoms are attached to the phenyl moieties of the polymerized styrene monomers. A particularly good polymer backbone is a styrene divinylbenzene copolymer containing greater than 0 to 50 mole percent, preferably 1 to 30 mole percent, more preferably 2 to 20 mole percent divinylbenzene.

The pendant atoms attached to the polymer backbone serve to strongly bond the ruthenium complex to the polymer backbone. To this end, the pendant atoms must be those which will form strong coordinate bonds with the ruthenium complex. P, As, Sb, Bi and N when in the trivalent state are suitable for this purpose. Phosphorus is the preferred pendant atom. Moreover, mixtures of different pendant atoms can be used on the same polymer backbone.

As appreciated by those skilled in the art, in order that these pendant atoms be trivalent, they must also be bonded to additional groups such as alkyl, aryl, alkoxy, aryloxy, dialkylamido, diarylamido and so forth. The nature of these groups is not critical, but they normally contain no more than twelve carbon atoms.

An important aspect of these catalysts is that the ruthenium atoms are bonded on the average to no more than two (preferably no more than one) phosphorus atoms since higher P/Ru ratios lead to a significant decline in catalytic activity. Accordingly, in the preferred embodiment of the invention when the pendant atom is phosphorus, the amount and distribution of the pendant phosphorus atoms in the polymer are selected so that the ruthenium atoms of the complex will not bond to two or more pendant phosphorus groups. Specifically, the pendant atoms should be randomly distributed in the polymer support and be present in an amount of no more than 15 mole percent based on the total number of polymerized monomeric units in the polymer backbone. In the case of a styrene divinyl benzene resin in which the pendant atoms bond to the phenyl moieties of the polymer, this means that the amount of pendant atoms will be no more that about 14 mole percent based on the phenyl moieties in the polymer. Usually the amount of pendant atoms will be 0.1 to 14, preferably 0.5 to 7, more preferably about 5 to 6 mole percent based on the phenyl moieties in the polymer.

The preferred polymer support is composed of the above styrene divinylbenzene copolymer containing 2 to 20 mole percent divinylbenzene and in which 0.5 to 7 mole percent, preferably 5 to 6 mole percent of the pendant phenyl groups from the copolymerized styrene contain the phosphine moiety (diphenyl phosphorus) at the para position. This polymer support can be regarded as a terepolymer of 75 to 97.6 mole percent styrene, 2 to 20 percent divinylbenzene and 0.4 to 6 percent para-diphenylphosphenostyrene.

Strongly bonded to the above polymer support via the above-noted pendant atom is a ruthenium complex capable of catalyzing the dimerization of acrylonitrile. Such complexes are well known and described, for example, in McClure et al., "Dimerization of Acrylonitrile to 1,4-Dicyano-1-butene with Ruthenium Complexes," *J. Organometal Chem*, Vol. 12, pgs. 8–12, (1968); U.S. Pat. Nos. 3,538,133, 3,671,569, 3,790,617 and 3,729,498.

In general, suitable ruthenium complexes are those which (1) will catalyze the dimerization reaction, (2) contain at least two homogeneous ligands having at least four ligating bonds bonding to the ruthenium and (3) have on the average no more than one homogeneous phosphine ligand per atom of ruthenium. "Homogeneous ligands" means ligands not covalently bonded to the polymer backbone.

Examples of such complexes are described by the following general formula:

wherein $L^1$ is a mono or bidentate ligand selected from F, Cl, Br, I, acac, or mixtures thereof, $L^2$ is one or more of acrylonitrile, methacrylonitrile, acetonitrile, propionitrile, benzonitrile, dimethylsulfoxide, water and a group of the formula

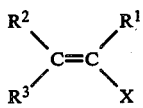

wherein
X is CN, $CO_2R^4$, CHO or $CONR_2^4$ and $R^1$, $R^2$, $R^3$ and $R^4$ are independently selected from $C_{1-16}$ alkyl, $C_{1-16}$ aryl and H, and wherein
$L^3$ is $R_3^5P$, $R_3^5As$, $R_3^5SB$, $R_3^6N$ and $R_2^6O$, or mixtures thereof wherein each $R^5$ is a $C_{1-16}$ group independently selected from alkyl, aryl, alkoxy, aryloxy, dialkylamido and diarylamido and $R^6$ is independently selected from $C_{1-16}$ alkyl, $C_{1-16}$ aryl or H, and further wherein
a is 1 to 3;
b is 0 to 6;
c is 0 to 6; and
a+b+c is at least 2 and further selected so that $L^1$, $L^2$ and $L^3$ are bonded to the Ru with 4 to 6 ligating bonds, said complex containing on the average no more than one homogeneous phosphine ligand.

Complexes having other mono and bidentate ligands can also be employed.

The P/Ru ratio in the catalyst produced by the inventive process should be no more than 2. Preferably the P/Ru ratio is no more than 1. To this end, the complex should have on the average no more than 1 homogeneous phosphine ligand per ruthenium atom. Preferably the complex has no homogeneous phosphine ligands.

Preferred ruthenium complexes are those which contain at least two halogen ligands per ruthenium atom and in addition $H_2O$ or acrylonitrile as at least one additional ligand. Particularly preferred ruthenium complexes are $RuCl_3.3H_2O$, $Ru(acac)_3$, $RuCl_2(AN)_3$, $RuBr_2(AN)_3$, $RuI_2(AN)_3$.

Other useful complexes are $RuCl_2(AN)_4$, $RuCl_2(CH_3C)_3$, $RuCl_2(propionitrile)_3$, $RuCl_2(PhCN)_4$, $RuBr_2(AN)_4$, $RuI_2(AN)_4$, $RuCl_2(C_8H_{12})$, $RuCl_2(C_4H_8)_3$, $RuCl_2(C_8H_{12})_2$, $RuCl_2(C_8H_{12})$(p-toluidine), $Ru(stearate)_3$, $Ru(trifluoroacetylacetonate)_3$, $RuCl_3(AsPh_3)_2$, $RuCl_2(SbPh_3)_4$, $[Ru(NH_3)_5Br]Br_2$ and $[Ru(NH_3)_5I]I_2$ wherein AN is acrylonitrile and Ph is phenyl.

The amount of ruthenium complex in the catalyst can vary widely. As a practical matter, the Ru/pendant atom ratio should be at least 0.001 and is preferably about 0.5 to 1.2. The upper limit is set by the fact that the polymer support will no longer take up complex.

Incidentally, "acac" is a commonly used abbreviation for acetyl acetonate.

Catalyst Manufacture

In accordance with the present invention, the above catalysts are made by a procedure which comprises contacting the polymer support with a liquid containing the ruthenium complex in a concentration of at least $10^{-6}$ Molar under conditions such that (1) contact of the complex and the support occurs for at least 6 minutes, (2) no more than 70% of the ruthenium complex is added to the polymer support at any one time and (3) the total amount of ruthenium complex in the liquid contacted with the polymer support is no less than one-tenth and no greater than ten times the amount of trivalent pendant atom in the support on a molar basis.

In accordance with the invention, the ruthenium complex in liquid form is contacted with the polymer support. For practical application, the ruthenium complex will be dissolved in a suitable solvent such as methylene chloride, acetone, isopropanol, benzene and toluene. For practical application, the ruthenium complex solution should be at least $10^{-6}M$ in the ruthenium complex but is more normally about $10^{-3}M$ in the ruthenium complex.

The ruthenium complex can be added to polymer support either in batch operation or continuously. In either case, no more than 70%, preferably no more than 50%, of the ruthenium complex should be added at any one time and the addition or additions should extend over a period of at least 6 minutes. If the additions are done in batch operation, there is no maximum amount of time for the addition procedure. In other words, a first addition can be carried out to produce a partially made catalyst which can be stored indefinitely and then partially impregnated again to form the catalyst of the invention. If the additions are carried out continuously, the total addition procedure should be accomplished in no longer than 1,000 hours. Preferably, continuous additions should occur over the time frame of 2 to 50 hours, more preferably 10 to 30 hours. Also, if the addition is carried out on a continuous basis, it is preferred that the ruthenium complex be added at a rate given by the following formula:

$$10^{-4}L \leq R \leq 10^2L,$$

wherein R is the rate of addition of the ruthenium complex in moles per hour and L is the number of moles of trivalent pendant atoms in the support.

If the additions are carried out in batch operation, it is preferred that no more than 10 batches be used.

An important aspect of the invention is that the amount of ruthenium complex in the liquid contacted with the polymer support be no less than one-tenth and no greater than ten times the amount of trivalent atom in the support on a molar basis. If the amount of ruthenium complex is outside these limits, the advantages of the invention will not be realized.

WORKING EXAMPLES

Comparative Example A 0.4 g of a ruthenium complex comprising $RuCl_2(AN)_3$, 35 ml methylene dichloride and 10 g of a polymer support comprising a random styrene/divinyl benzene para-diphenylphosphenostyrene terepolymer containing 79 mole percent styrene, 20 mole percent divinyl benzene and 1 mole percent para-diphenylphosphenostyrene in the form of beads were stirred together under a nitrogen atmosphere for 24 hours. The beads were then filtered and washed with additional methylene chloride until the solvent was colorless. The beads were then dried under vacuum for 8 hours to produce a catalyst having an Ru/P ratio of 0.42.

Into a 300 ml Parr autoclave, 100 mmole acrylonitrile, 0.5 g of the above catalyst, 4 mmole N-methylpyrolidince, 20 ml acetone solvent and 1 ml $C_{15}H_{32}$ as internal standard for GC analysis were charged. The autoclave was then charged with 80 psi $H_2$ and heated at 110° C. for roughly 4 hours. After the reaction, the reaction mixture was filtered and analyzed by gas chromatography. it was found that 19.8% of the acrylonitrile was reacted with a selectivity to the desired dimer products being 48.0% and a selectivity to by-products propionitrile being 52.0%.

Example 1

5 g of the catalyst produced in Comparative Example A, 0.2 g $RuCl_2(AN)_3$ and 35 ml methyldichloride were mixed together under the same procedure described in Comparative Example A to form a double-impregnated catalyst. The catalyst so obtained had an Ru/P ratio of 0.78. When reacted under the same conditions as in Example A, it was found that 25.0% of the acrylonitrile charged reacted with a selectivity to the desired dimer products of 57.0% and a selectivity to the by-product propionitrile of 43.0%.

Example 2

3 g of the catalyst produced in Example 1 together with 0.2 g $RuCl_2(AN)_3$ and 30 ml methylene dichloride were charged into a Schlenk flask and the mixture stirred under nitrogen for 24 hours. The polymer beads were filtered, washed with methylene dichloride until the liquid was colorless and dried under vacuum for 8 hours. A catalyst in which the Ru/P ratio was 0.80 was produced.

The catalyst obtained was used for the dimerization of acrylonitrile under the same reaction conditions as the preceding examples. Acrylonitrile conversion was found to be 23.0% with a selectivity to the desired dimer products of 62.0% and a selectivity to propionitrile by-product of 38.0%.

Example 3

1.0 g of the same polymer beads used in Comparative Example A was placed in a 50 ml round bottomed flask and 5 ml methylene dichloride added. 0.1 g $RuCl_2(AN)_3$ was dissolved in 20 ml methylene dichloride and the mixture placed in a 20 ml gas tight syringe pump. The flask was capped with a rubber septum and kept under a nitrogen atmosphere while the solution in the flask was continuously stirred for a period of 24 hours. For the first 20 hours, the $RuCl_2(AN)_3$ solution was charged into the flask by the syringe pump at a rate of 1 ml per hour. After 24 hours, the beads were filtered, washed with methylene chloride until the wash liquid was colorless and dried under vacuum for 8 hours. The catalyst obtained was found to have an Ru/P ratio of 1.07.

The catalyst obtained was tested in the dimerization of acyrlonitrile in the same was as the previous examples. The acrylonitrile conversion was 12.0% while the selectivity to the desired dimer products was 57.0% and the selectivity to propionitrile by-product was 43.0%.

We claim:

1. A process for producing a catalyst comprising a polymer support having a ruthenium complex bonded thereto, the polymer support comprising an organic polymer backbone having trivalent P pendant atoms covalently bonded thereto and randomly distributed in the polymer, the ruthenium complex capable of catalyzing the dimerization of acrylonitrile to adiponitrile and/or 1,4-dicyanobutenes and comprising Ru and at least two homogeneous ligands having at least four ligating bonds bonding to the Ru, the Ru in each ruthenium complex datively bonding to a pendant atom in the polymer support, the Ru/pendant atom ratio in the catalyst being at least 0.001, the complex having on the average no more than one homogeneous phosphine ligand per atom of ruthenium, the process comprising contacting said polymer support with a liquid containing said ruthenium complex in a concentration of at least $10^{-6}$M either (1) in separate batches, no more than 70 percent of the ruthenium complex being added to the polymer support at any one time, each batch addition taking place over a period of time of at least 6 minutes, or (2) continuously over a period of 2 to 50 hours, the amount of ruthenium complex contacting said polymer support being no less than one-tenth and no greater than ten times the amount of trivalent pendant atoms in said support on a molar basis.

2. The process of claim 1 wherein said complex is continuously added to said support, the rate of complex addition being defined by the formula:

$$10^{-4}L \leq R \leq 10^2L$$

wherein
R is the rate of addition of Ru in moles per hours, and
L is the number of moles of trivalent pendant atoms in the support.

3. The process of claim 2 wherein said period of time is 10 to 30 hours.

4. The process of claim 1 wherein said polymer support is a styrene divinyl benzene polymer and said complex has the formula $$RuL^1_a L^2_b L^3_c$$

wherein
$L^1$ is a mono or bidentate ligand selected from F, Cl, Br, I, acac, or mixtures thereof,
$L^2$ is one or more of acrylonitrile, methacrylonitrile, acetonitrile, propionitrile, benzonitrile, dimethylsulfoxide, water and a group of the formula

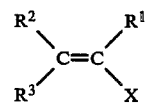

wherein
X is CN, $CO_2R^4$, CHO or $CONR_2^4$ and $R^1$, $R^2$, $R^3$ and $R^4$ are independently selected from $C_{1-16}$ alkyl, $C_{1-16}$ aryl and H, and
wherein
$L^3$ is $R_3^5P$, $R_3^5As$, $R_3^5Sb$, $R_3^6N$ and $R_2^6O$, or mixtures thereof wherein each $R^5$ is a $C_{1-16}$ group independently selected from alkyl, aryl, alkoxy, aryloxy, dialkylamido and diarylamido and $R^6$ is independently selected from $C_{1-16}$ alkyl, $C_{1-16}$ aryl or H, and further
wherein
a is 1 to 3;
b is 0 to 6;
c is 0 to 6; and
a+b+c is at least 2 and further selected so that $L^1$, $L^2$ and $L^3$ are bonded to the Ru with 4 to 6 ligating bonds,
said complex containing on the average no more than one homogeneous phosphine ligand.

5. The process of claim 1 wherein said ruthenium complex is added to said support in a series of batches.

6. The process of claim 5 wherein said series comprises 2 to 10 latches.

7. The process of claim 5 wherein said polymer support is a polymer of styrene and divinyl benzene, said pendant atom is phosphorus and said complex has the formula $$RuL^1_a L^2_b L^3_c$$

wherein

L¹ is a mono or bidentate ligand selected from F, Cl, Br, I, acac, or mixtures thereof, L² is one or more of acrylonitrile, methacrylonitrile, acetonitrile, propionitrile, benzonitrile, dimethylsulfoxide, water and a group of the formula

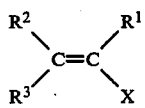

wherein

X is CN, CO₂R⁴, CHO or CONR₂⁴ and R¹, R², R³ and R⁴ are independently selected from C₁₋₁₆ alkyl, C₁₋₁₆ aryl and H, and wherein L³ is R₃⁵P, R₃⁵As, R₃⁵SB, R₃⁶N and R₂⁶O, or mixtures thereof wherein each R⁵ is a C₁₋₁₆ group independently selected from alkyl, aryl, alkozy, aryloxy, dialkylamido and diarylamido and R⁶ is independently selected from C₁₋₁₆ alkyl, C₁₋₁₆ aryl or H, and further wherein a is 1 to 3;

b is 0 to 6;

c is 0 to 6; and a+b+c is at least 2 and further selected so that L¹, L² and L³ are bonded to the Ru with 4 to 6 ligating bonds, said complex containing on the average no more than one homogeneous phosphine ligand.

8. A process for producing a catalyst comprising a polymer support having a ruthenium complex, RuCl₂(AN)₃, bonded thereto, the polymer support comprising an organic polymer support comprising a random styrene/divinyl benzene para-diphenylphosphenostyrene terepolymer containin 79 mole percent styrene, 29 mole percent divinyl benzene and 1 mole percent para-diphenylphosphenostyrene in particulate form, the Ru in the ruthenium complex datively bonding to a pendant atom in the polymer support, the Ru/pendant atom ratio is the catalyst being at least 0.001, the complex having on the average no more than one homogeneous phosphine ligand per atom of ruthenium, the process comprising contacting said polymer support with a liquid containing said ruthenium complex in a concentration of at least $10^{-6}$M in at least two separate batches of no more than 70 percent of the ruthenium complex being added to the support at any one time, each batch addition taking place over a period of at least 6 minutes, the amount of ruthenium complex contacting said polymer support being no less than one-tenth and no greater than ten times the amount of trivalent pendant atoms in said support on a molar basis.

* * * * *